United States Patent [19]

Imai

[11] Patent Number: 4,613,748
[45] Date of Patent: Sep. 23, 1986

[54] FOCUS DETECTION APPARATUS EMPLOYING IMAGE HEIGHT CORRECTION

[75] Inventor: Yuji Imai, Higashiyamato, Japan

[73] Assignee: Olympus Optical Co., Ltd., Tokyo, Japan

[21] Appl. No.: 552,612

[22] Filed: Nov. 17, 1983

[30] Foreign Application Priority Data

Nov. 22, 1982 [JP] Japan ................................ 57-205031

[51] Int. Cl.$^4$ ................................................ G01J 1/20
[52] U.S. Cl. ........................................ 250/201; 250/204
[58] Field of Search ............... 250/201, 204, 208, 209, 250/578; 354/403–408

[56] References Cited

U.S. PATENT DOCUMENTS

| | | | |
|---|---|---|---|
| 4,306,143 | 12/1981 | Utagawa et al. | 250/201 |
| 4,441,096 | 4/1984 | Evanchuk | 250/204 |
| 4,447,719 | 5/1984 | Ogasawara | 250/204 |
| 4,500,189 | 2/1985 | Aoki | 354/407 |

*Primary Examiner*—David C. Nelms
*Attorney, Agent, or Firm*—Parkhurst & Oliff

[57] ABSTRACT

In a method for detecting a focus condition which utilizes an image lateral shift between images formed alternately on light receiving elements substantially arranged on a focal plane, an incident light unbalance on the light receiving elements caused by an image height effect for respective light receiving elements and a relative positional shift between a pupil dividing means and the light receiving element is corrected by using correction coefficients previously stored in a digital memory. The correction coefficients for respective light receiving elements are derived from inversion outputs of respective light receiving elements under the condition such that a uniform light flux is projected onto the imaging optical system before effecting an actual focus detecting operation. It is possible to make the optical system small in size and inexpensive in cost, because it is not necessary to use an additional optical system. In addition, it is possible to detect the focus condition in a highly accurate manner, since no incident light unbalance occurs.

7 Claims, 18 Drawing Figures

FIG_11A
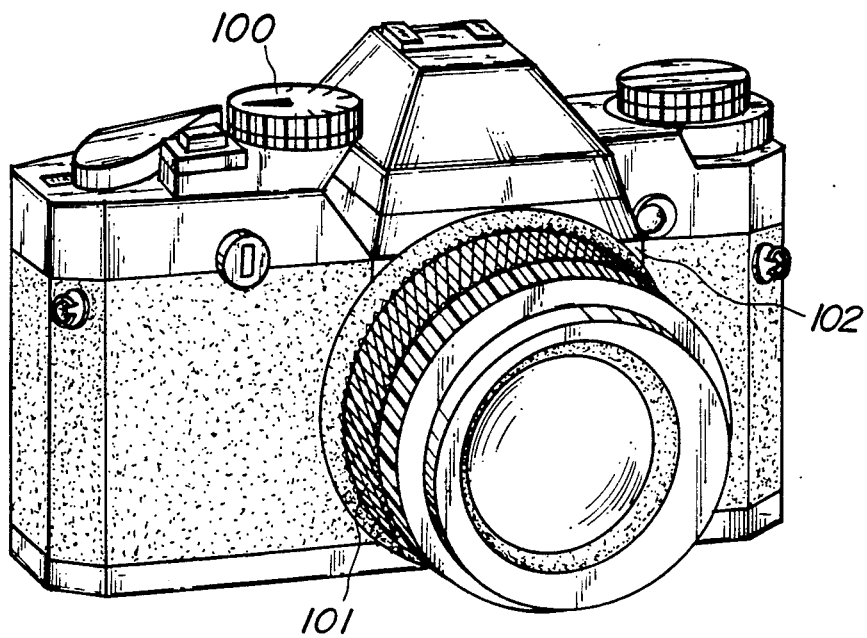
FIG_11B
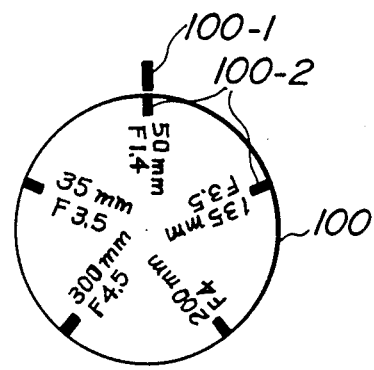

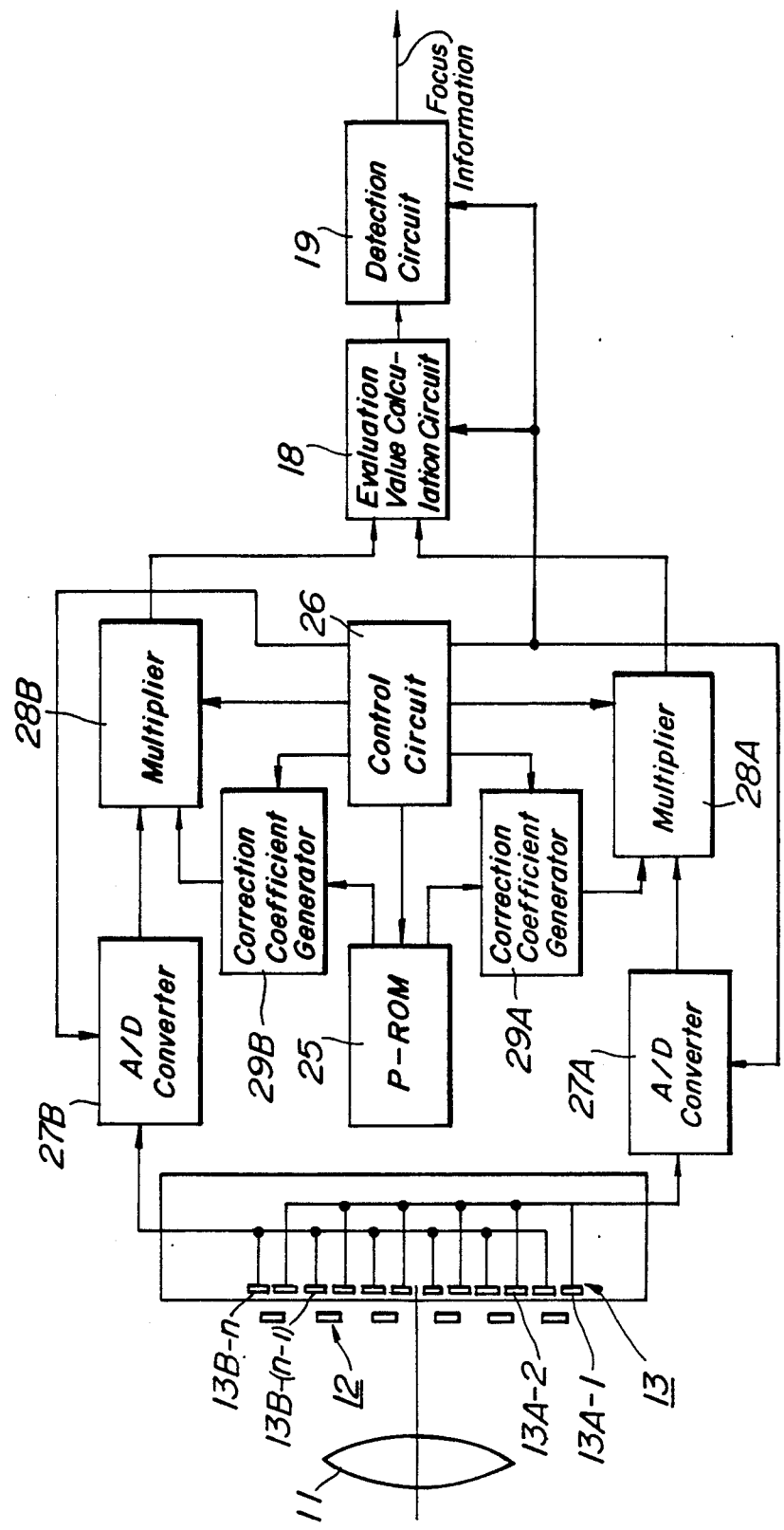
FIG._13

FIG_14A
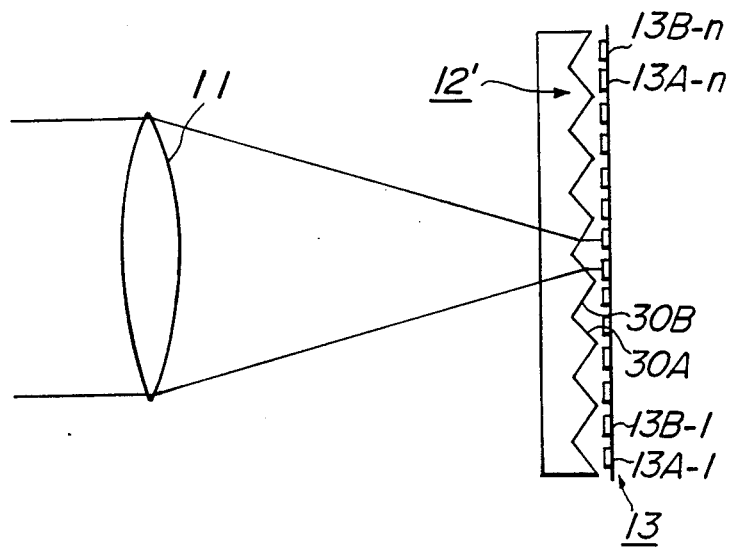
FIG_14B
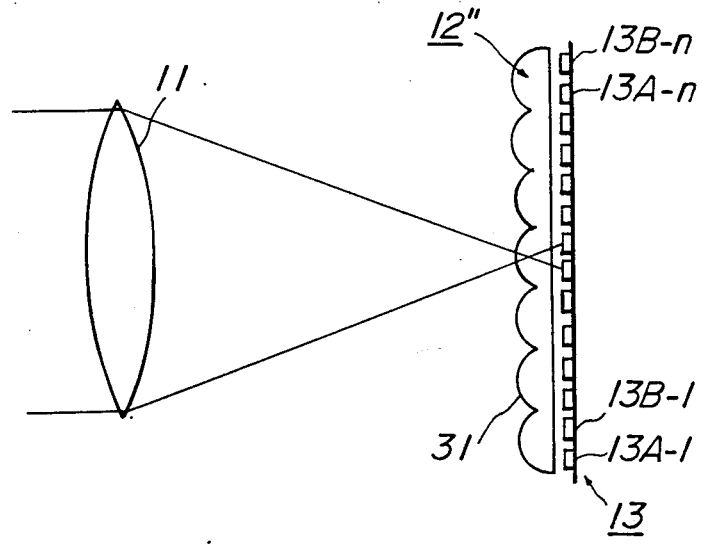

FOCUS DETECTION APPARATUS EMPLOYING IMAGE HEIGHT CORRECTION

BACKGROUND OF THE INVENTION

The present invention relates to a focus detection method for use in an apparatus having a light receiving element array arranged on a predetermined focal plane of an imaging optical system or a plane equivalent thereto and a pupil dividing means for projecting light fluxes transmitted through first and second regions arranged symmetrically with respect to a plane including a light axis of an exit pupil of said imaging optical system onto adjacent light receiving elements in said light receiving element array, including the steps of calculating a lateral shift amount between images formed on a first light receiving element group which receives the light flux transmitted through said first region and on a second light receiving element group which receives the light flux transmitted through said second region, and detecting a focus condition of the image formed by means of said imaging optical system.

Heretofore, there has been proposed various methods for detecting the focus condition. For example, as shown in FIG. 1, a light flux transmitted through an imaging lens 1 is divided by a pupil dividing means 2 such as a stripe mask, a plurality of micro lenses or micro prisms, and the thus divided light fluxes are made incident upon a light receiving element array 3. The pupil dividing means 2 is arranged in such a manner that the light fluxes transmitted through different regions of an exit pupil are alternately made incident upon successive light receiving elements which construct the light receiving element array 3. Therefore, the images respectively formed on odd numbered light receiving elements $3_1$-A, $3_2$-A, ... $3_n$-A and even numbered light receiving elements $3_1$-B, $3_2$-B, ... $3_n$-B are made identical with each other in an in-focus condition, but are laterally shifted from each other corresponding to a lateral shift direction in a de-focus condition. Then, the focus condition of the imaging lens 1 is detected in response to an output difference between the odd numbered light receiving element group and the even numbered light receiving element group.

However, in this case, if it is assumed that a distance between an image plane 5 on which a projected image of an object 4 is formed by means of the imaging lens 1 is $L_0$ and the image height i.e. a distance between an image point 5-1 corresponding to an object point 4-1 and an optical axis 7 is x, as shown in FIG. 2, a main light flux 8 which is introduced from the object point 4-1 to the image point 5-1 is inclined with respect to the optical axis 7 by an angle $\alpha(x) = \tan^{-1}(x/L_0)$ corresponding to the image height. Therefore, light intensities of the image 4 projected onto the adjacent light receiving elements become different from each other corresponding to the image height, so that a light intensity unbalance occurs and thus it is not possible to perform the focus detection in a highly accurate manner. Hereinafter, such an effect is called the image height effect.

Now, this undesired effect of the image height will be explained in detail with reference to FIG. 3.

The focus detection device shown in FIG. 3 which utilizes the stripe mask as the pupil dividing means 2 is constructed in such a manner that a pitch between light transmitting portions of the stripe mask is 2P, a pitch between the light receiving elements of the light receiving element array 3 is P, and respective light transmitting portions (in FIG. 3, only the portions $2_i$, $2_j$ are shown principally) correspond to light receiving element pairs respectively (in FIG. 3, only the light receiving element pairs $3_i$-A; $3_i$-B and $3_j$-A; $3_j$-B which correspond to the light transmitting portions $2_i$ and $2_j$ respectively are shown). Therefore, the adjacent odd numbered light receiving element and even numbered light receiving element receive respectively the light fluxes transmitted through the different regions of the exit pupil.

In this case, if it is assumed that center points of the light transmitting portions $2_i$ and $2_j$ are $2_i$-S and $2_j$-S, the light receiving element pair $3_i$-A; $3_i$-B arranged near the optical axis 7 receives equal amounts of light flux transmitted through the light transmitting portion $2_i$ with respect to the center point $2_i$-S. Contrary to this, the light receiving element pairs $3_j$-A; $3_j$-B arranged far from the optical axis 7 receive different amounts of light flux transmitted through the light transmitting portion $2_j$ with respect to the center point $2_j$-S. That is to say, if the position of the light receiving element pair become far from the optical axis 7 as shown in FIG. 3, one light receiving element $3_j$-B receives the light flux transmitted through more than half region of the exit pupil of the imaging lens 1 and the other light receiving element $3_j$-A receives the light flux transmitted through less than half region correspondingly. Therefore, when outputs of respective light receiving elements in the light receiving element array 3 are successively read out from one end to the other end for an object having uniform contrast, the output distribution is shown by FIG. 4. In FIG. 4, only the outputs $A_i$, $B_i$ of the light receiving element pair $3_i$-A, $3_i$-B corresponding to the light transmitting portion whose center point is made identical become equal, but the outputs of the light receiving element pair corresponding to the light transmitting portion whose center point is far from the optical axis 7 become unbalanced and a polarity of a difference therebetween is inverted with respect to the optical axis 7.

Therefore, if an intensity distribution of the object on the image plane is varied like a sine curve as shown in FIG. 5A, envelopes 3A and 3B of the odd and even numbered light receiving element groups are laterally shifted as shown by a solid and a dotted line, respectively, in FIG. 5B in the de-focus condition when ignoring the image height effect, but when the image height effect is taken into account these envelopes 3A and 3B are modulated by the light amount unbalance caused by the image height effect as shown in FIG. 5C and thus the detection accuracy is greatly affected.

As to the method for eliminating the drawbacks mentioned above, there has been proposed the method in Japanese Laid-Open Publication No. 130,524/80 wherein the light fluxes transmitted through the different regions of the exit pupil are made incident upon respective light receiving elements in the light receiving element pair at a constant pupil dividing ratio by correcting an inclination of a main light flux of the imaging lens with respect to the image height position by means of a correction lens arranged between the imaging lens and the pupil dividing means. FIG. 6 is a schematic view for explaining the optical system wherein the correction lens is arranged in front of the pupil dividing means shown in FIG. 3 using the stripe mask, and portions in FIG. 6 similar to those shown in FIG. 3 are denoted by the same reference numerals used in FIG. 6.

In this method, the light flux transmitted through the imaging lens 1 is converted into parallel light flux by means of the correction lens 9 arranged between the imaging lens 1 and the stripe mask 9, and the parallel light flux is made incident upon the stripe mask 2 so that the inclination of the main light flux caused by the image height is corrected. However, in this method, since it is necessary to use the correction lens for correcting the inclination of light flux upon the the pupil dividing means, the apparatus becomes expensive in cost and further needs a space for the correction lens. Moreover the number of adjusting points during manufacture increases.

Heretofore, the incident light unbalance caused by the image height effect has been explained, but such incident light unbalance is also caused by a relative positional shift in the light receiving element array direction between the pupil dividing means and the light receiving element. In a normal case, the center point $2_i$-S of the light transmitting portion $2_i$ must be positioned just above a center point $3_i$-S between the light receiving elements $3_i$-A and $3_i$-B, but as shown in FIG. 7 if the stripe mask is laterally shifted with respect to the light receiving elements $3_i$-A and $3_i$-B, the incident light amount projected onto the odd numbered light receiving element group is increased and that projected onto the even numbered light receiving element group is decreased. The relative positional shift between the stripe mask 2 and the light receiving element array 3 is caused by various factors such as nominal errors in a dimension and a pitch of the light transmitting portion of the stripe mask 2, those of the light receiving elements in the light receiving element array 3, and a possible lateral shift between the stripe mask 2 and the light receiving element array 3. If such relative positional shift occurs and a uniform light is projected onto the light receiving element array through the imaging lens, an output distribution of the light receiving element array becomes, for instance, as shown in FIG. 8 wherein the output distributions of the odd numbered light receiving element group and the even numbered light receiving element group are respectively varied in a linear manner. Therefore, when the intensity distribution of the object on the image plane is varied like the sine curve as shown in FIG. 5A, the respective output envelopes 3A and 3B of the odd and the even numbered light receiving element groups are modulated as shown in FIG. 9 by the light intensity unbalance caused by the relative positional shift shown in FIG. 8, and thus the detection accuracy is greatly affected. Moreover, FIG. 9 shows the envelope in the de-focus condition. Such light intensity unbalance based on the relative positional shift between the stripe mask 2 and the light receiving element array 3 cannot be corrected even if the correction lens is arranged between the imaging lens 1 and the stripe mask 2 as shown in FIG. 6.

As mentioned above, in the focus detection method which utilizes the image lateral shift between the images formed respectively on the light receiving element groups which receive the light fluxes transmitted through the first and the second regions of the exit pupil of the imaging optical system, by means of the pupil dividing means arranged in the light path between the imaging optical system and the light receiving element array positioned on the predetermined focal plane or the plane equivalent thereto, the incident light amount projected onto the light receiving element groups becomes unbalanced corresponding to the image height effect and the relative positional shift between the pupil dividing means and the light receiving element, and thus it is not possible to detect the focus condition in a highly accurate manner.

SUMMARY OF THE INVENTION

The present invention has for its object to eliminate the drawbacks mentioned above and to provide a method for detecting a focus condition which can perform the focus detection always in a highly accurate manner by means of a small and inexpensive optical system, even if an incident light unbalance based on an image height effect and the relative positional shift has occurred.

According to the invention, in a method for detecting a focus condition for use in an apparatus having light receiving element arrays arranged on a predetermined focal plane of an imaging optical system or a plane equivalent thereto and a pupil dividing means for projecting alternately light fluxes transmitted through first and second regions of an exit pupil of said imaging optical system onto adjacent light receiving elements in said light receiving element array, including the steps of calculating a lateral shift amount between images formed on a first light receiving element group which receives the light flux transmitted through said first region and on a second light receiving element group which receives the light flux transmitted through said second region and detecting a focus condition of the image to be observed which is formed by means of said imaging optical system, the improvement further comprising the step of correcting an image unbalance of incident light fluxes projected onto a plurality of light receiving elements in said light receiving element array through said pupil dividing means by multiplying outputs of said light receiving elements with corresponding correction coefficients.

BRIEF DESCRIPTION OF THE DRAWINGS

FIGS. 11A and 11B are schematic views for explaining a correction coefficient group selecting operation corresponding to an interchangeable lens in a manual manner;

FIGS. 12 and 13 are block diagrams illustrating other embodiments of the focus detection apparatus for effecting the method according to the invention; and FIGS. 14A and 14B are schematic views illustrating other embodiments of the pupil dividing means.

DESCRIPTION OF THE PREFERRED EMBODIMENTS

Figure 1:
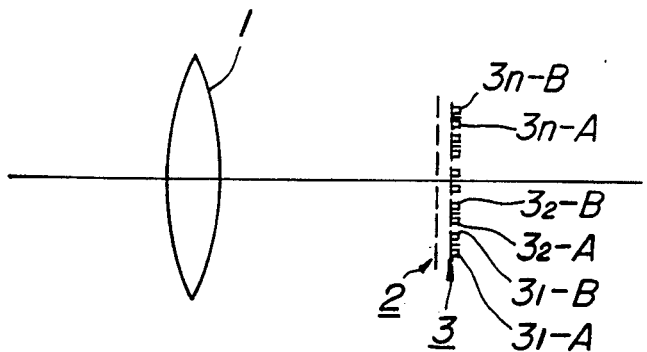
FIG. 1 is a schematic view showing one embodiment of an optical system for use in a focus detection apparatus of a lateral shift detection type.
Figure 2:
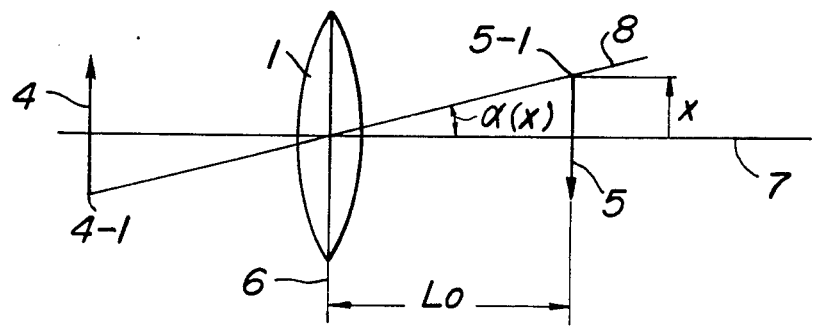
FIGS. 2, 3 and 4 and FIGS. 5A, 5B and 5C are schematic views for explaining an image height effect in the optical system shown in FIG. 1.
Figure 3:
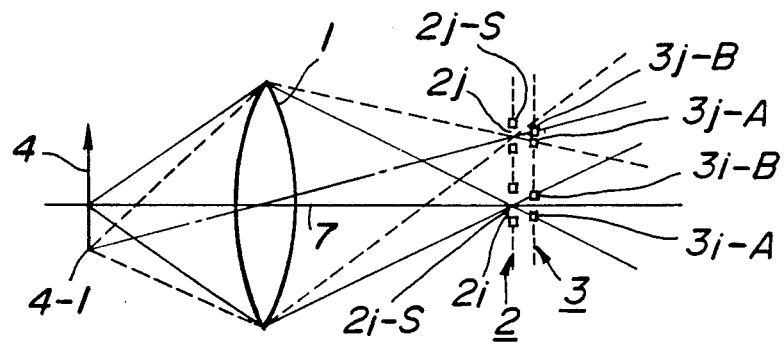
Figure 4:
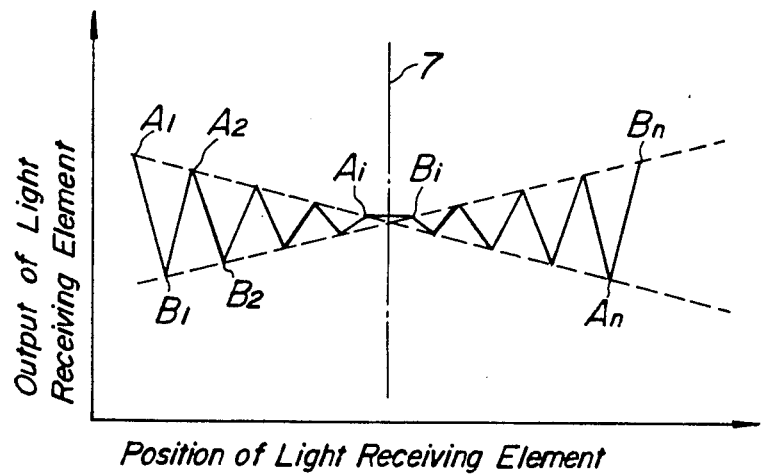
Figure 5A:
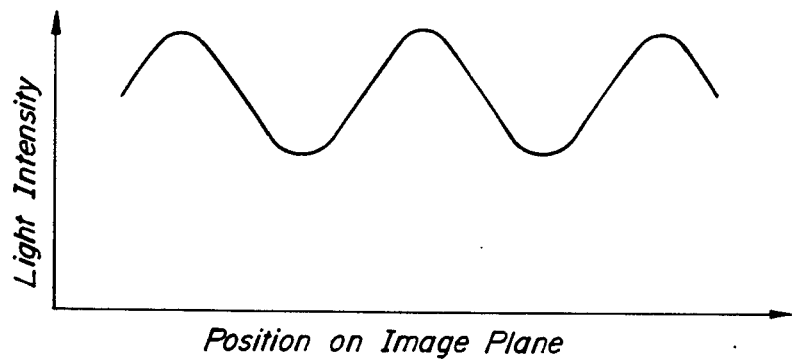
Figure 5B:
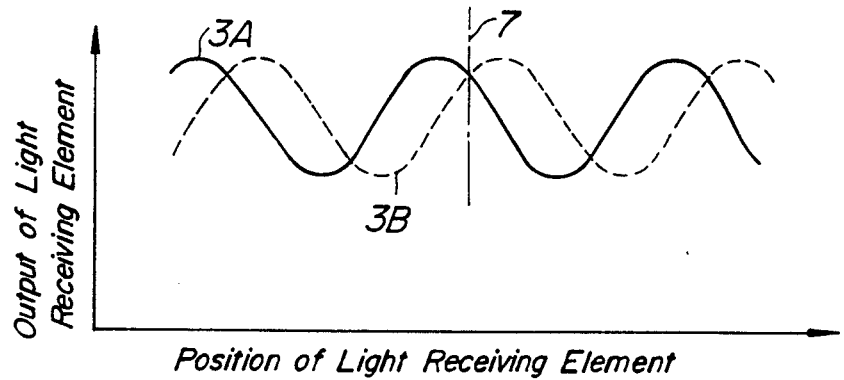
Figure 5C:
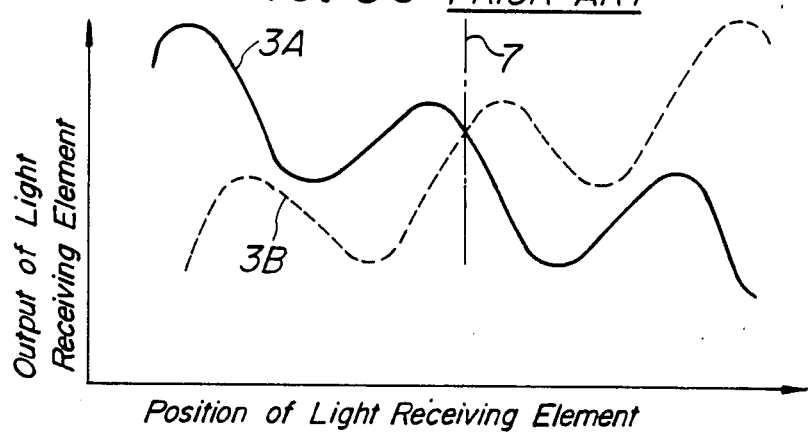
Figure 6:
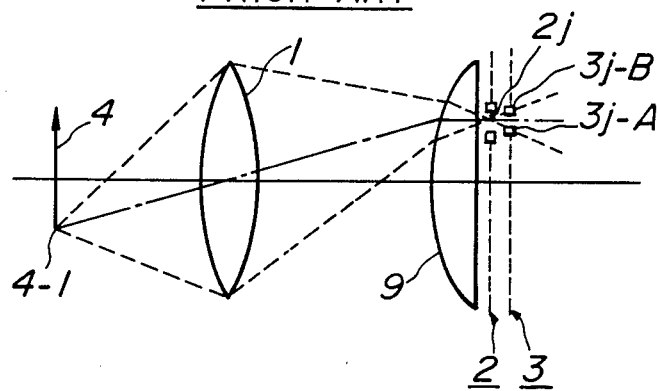
FIG. 6 is a schematic view showing one embodiment of an optical system including a conventional correction lens for correcting the image height effect.
Figure 7:
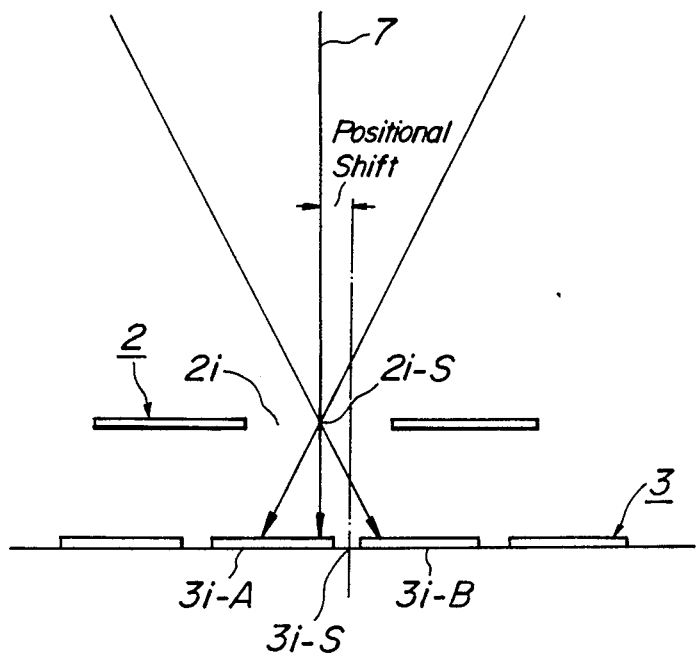
FIGS. 7, 8 and 9 are schematic views for explaining an incident light unbalance caused by a relative positional shift between a pupil dividing means and a light receiving element.
Figure 8:
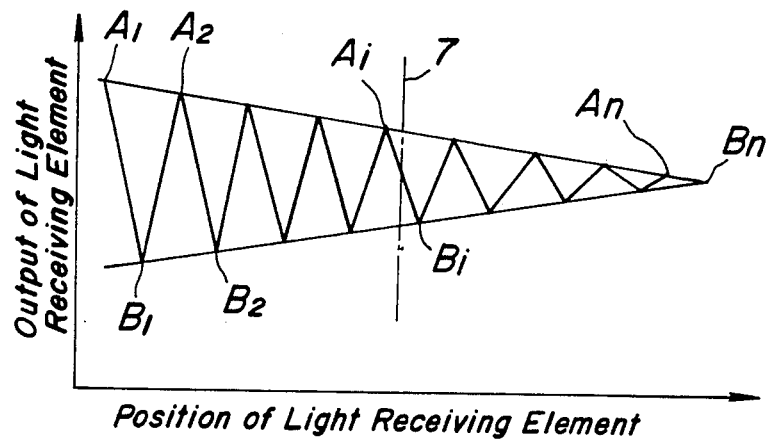
Figure 9:
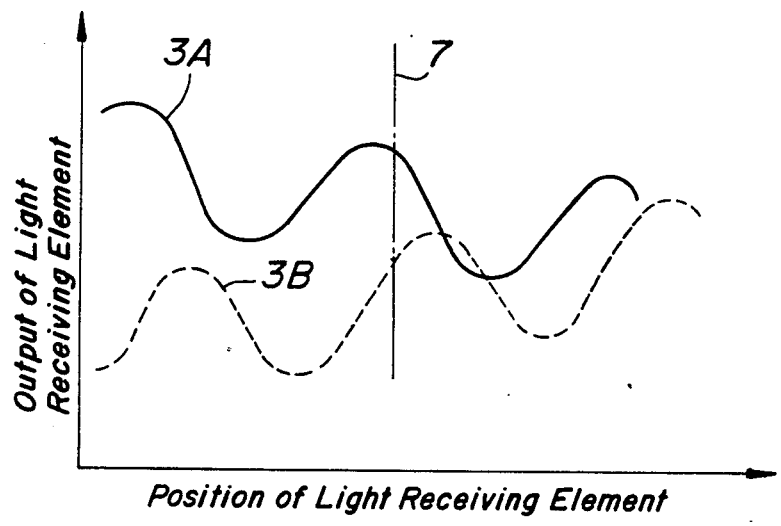
Figure 10:
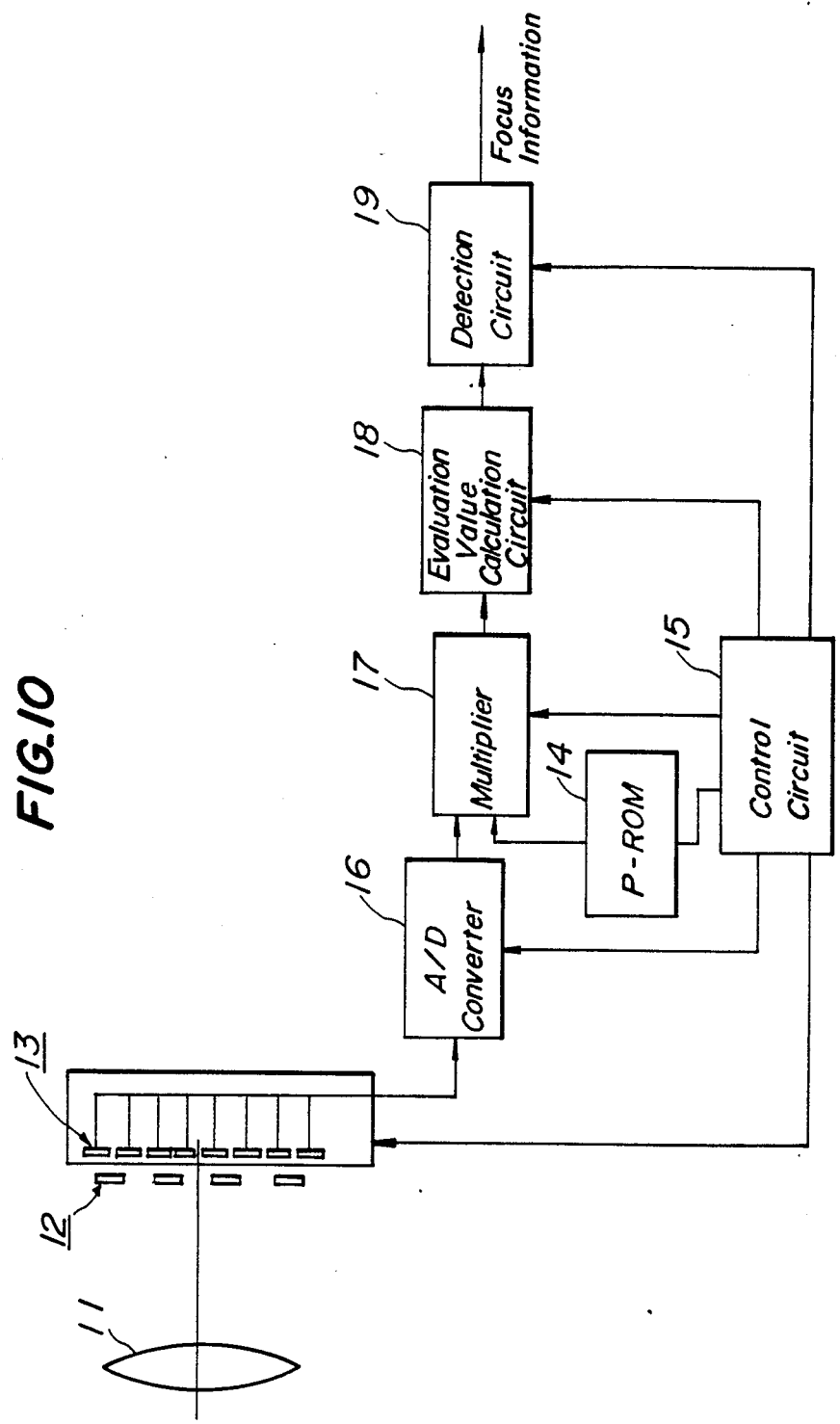
FIG. 10 is a block diagram showing one embodiment of the focus detection apparatus for effecting the method according to the invention.

FIG. 10 is a block diagram showing one embodiment of a focus detection apparatus for effecting the method according to the invention. In this embodiment, light fluxes transmitted through first and second regions of an imaging optical system 11 are alternately made incident upon successive light receiving elements in a light receiving element array 13 by means of a pupil dividing means 12 consisting of a stripe mask. Therefore, in this case, incident light amounts projected onto respective light receiving elements in the light receiving element array 13 become unbalanced due to the image height effect. Further, if a position of the pupil dividing means 12 is laterally shifted with respect to the light receiving element array 13, the incident light unbalance also occurs due to this relative positional shift. Therefore, in this embodiment, after the optical system is arranged in this manner, correction coefficients for respective light receiving elements are derived from inversion outputs of respective light receiving elements under the condition such that a uniform light flux is projected onto the imaging optical system 11, and then the thus derived correction coefficients are preliminary stored in a digital memory such as a P-ROM 14 before an actual measurement is performed.

In the actual measurement, the outputs of the respective light receiving elements in the light receiving element array 13 are successively read out under the control of a control circuit 15 and are converted into digital signals by an A/D converter 16. In a multiplier 17, the thus converted digital signals and corresponding correction coefficients (digital values) stored in the P-ROM 14 are successively multiplied by each other under the control of the control circuit 15, and the thus multiplied signals are successively supplied to an evaluation value calculation circuit 18. In this manner, since the outputs of respective light receiving elements and the corresponding correction coefficients are multiplied by each other, it is possible to eliminate the incident light unbalance on the light receiving elements due to the image height effect and the relative positional shift mentioned above. In the evaluation value calculation circuit 18, an evaluation value F is calculated on the basis of the corrected outputs of the light receiving elements from an equation, for example, $F = \rho(|a_{n+1} - b_n| - |a_n - b_n|)$ where $a_n$ is the output of the odd numbered light receiving element and $b_n$ is the output of the even numbered light receiving element. Since the evaluation value F becomes zero when the imaging optical system 11 is in an in-focus condition and has a positive or negative value in accordance with in a de-focus condition, it is possible to derive focus conditions such as in-focus, forwardly de-focus and backwardly de-focus by detecting the evaluation value F in a detection circuit 19. This focus information is indicated on an indicator and is used for effecting automatically a focus control by a motor which serves to drive the imaging optical system 11. If this system mentioned above is applied to a single-lens reflex camera, the correction coefficient is varied corresponding to an aperture number and each focal length of a lens to be used. In this case, a plurality of correction coefficient groups corresponding to each kind of interchangeable lens are previously stored in the P-ROM 14, and these correction coefficient groups may be selected automatically or manually corresponding to the intechangeable lens to be used. FIGS. 11A and 11B are schematic views for explaining a correction coefficient group selecting operation corresponding to the interchangeable lens in the manual manner. In this embodiment, a numeral 100 is a rotary switch on which marks 100-2 representing the interchangeable lenses are arranged as shown in FIG. 11B, and the correction coefficient group selecting operation is performed by rotating the switch 100 in such a manner that a relevant mark 100-2 to be selected is aligned with a mark 100-1 arranged on a camera body. Moreover, if a kind of the interchangeable lens can be detected by utilizing a connecting portion between the interchangeable lens 101 and a lens mount 102 as shown in FIG. 11A, it is possible to select the correction coefficient group automatically. In this case, the kind of lens may be detected by arranging a tip portion on a connecting surface of the lens with the lens mount 102 or by magnetic manner.

Figure 12:
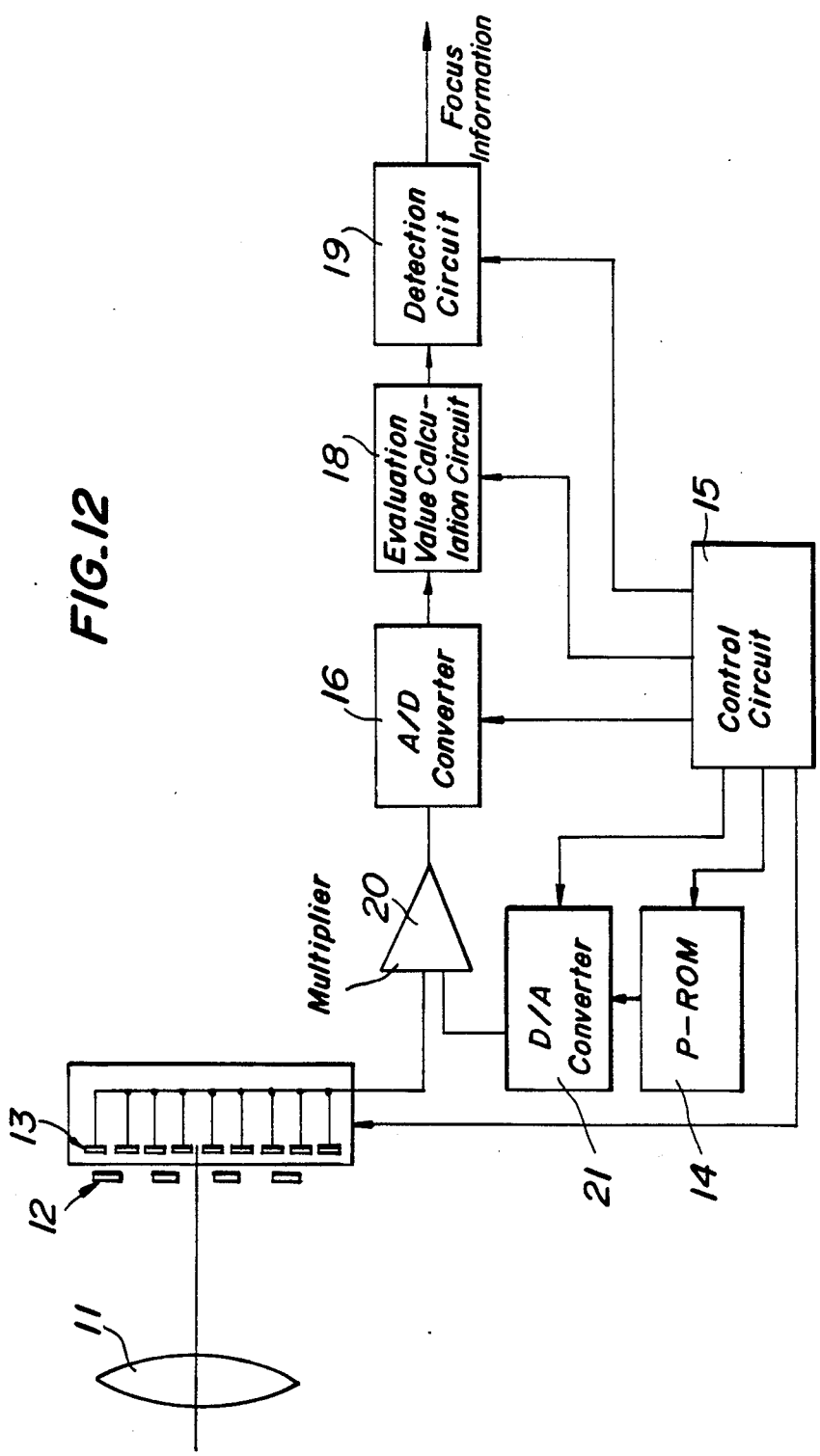

FIG. 12 is a block diagram showing another embodiment of the focus detection apparatus for effecting the method according to the invention. In this embodiment, the incident light unbalance on the light receiving element array 13 is corrected by means of an analog multiplier, and the other constructions are the same as the embodiment shown in FIG. 10. Therefore, successive outputs from the light receiving element array 13 are supplied to one input terminal of an analog multiplier 20, and the corresponding correction coefficients previously stored in the P-ROM 14 are also supplied to the other input terminal of the analog multiplier 20 through a D/A converter 21 under the control of the control circuit 15 so as to correct the output variation due to the incident light unbalance on the respective light receiving elements. Further, the outputs of the multiplier 20 are successively converted into digital signals by the A/D converter 16 and are further supplied to the evaluation value calculation circuit 18. In this manner, since the multiple operation between the output of the light receiving element and the corresponding correction coefficient is performed by the analog multiplier 20, it is possible to shorten the calculation time as compared with the digital multiplier and is possible to obtain the focus information faster.

FIG. 13 is a schematic view showing still another embodiment of the focus detection apparatus for effecting the method according to the invention. In this embodiment, similar to the embodiments mentioned above, the light fluxes transmitted throught the first and the second regions of the exit pupil of the imaging optical system 11 are alternately made incident upon respective light receiving elements in the light receiving element array 13 by means of the pupil dividing means 12 consisting of the stripe mask. However, as to the correction coefficients for correcting the incident light unbalance on respective light receiving elements, only a part of the correction coefficients corresponding to a specific part of the light receiving elements are previously stored in a P-ROM 25, and remaining correction coefficients corresponding to the other light receiving elements are calculated on the basis of the stored correction coefficients. That is to say, the output distributions of the odd numbered and the even numbered light receiving elements groups due to the incident light unbalance based on the image height effect on the light receiving element array 13 and the relative positional shift between the light receiving element and the pupil dividing means 12 become almost linear respectively. Therefore, if the correction coefficient corresponding to a certain light receiving element and a coefficient difference between this correction coefficient and that corresponding to the next light receiving element are stored for respective light receiving element groups, the correction coefficients of successive light receiving elements can be calculated from the thus stored one correction coefficient and coefficient difference.

In this embodiment, as for the odd numbered light receiving element group in the light receiving element array 13, the correction coefficient $X_1$ corresponding to the first light receiving element 13A-1 and the coefficient difference $(X_2-X_1)$ between the correction coefficient $X_1$ and the correction coefficient $X_2$ corresponding to the next light receiving element 13A-2 are previously stored in a P-ROM 15. Moreover, as for the even numbered light receiving element group, the correction coefficient $Y_n$ corresponding to the last light receiving element 13B-n and the coefficient difference $(Y_{n-1}-Y_n)$ between the correction coefficient $Y_n$ and the previous correction coefficient $Y_{n-1}$ are also previously stored in the P-ROM 25. In this manner, under the control of a control circuit 26, the outputs of the odd numbered light receiving element group in the light receiving element array 13 are successively read out from the first light receiving element array 13A-1 and are further supplied to one input terminal of a digital multiplier 28A through an A/D converter 27A, and also the outputs of the even numbered light receiving element group are successively read out from the last light receiving element 13B-n to the first light receiving element 13B-1 and are further supplied to one input terminal of a digital multiplier 28B through an A/D converter 27B.

Moreover, the correction coefficients and the coefficient differences both previously stored in the P-ROM 25 are supplied to correction coefficient generators 29A and 29B under the control of the control circuit 26. In the correction coefficient generators 29A and 29B, the correction coefficients corresponding to the outputs of the light receiving elements are obtained by calculating the thus supplied correction coefficients and the coefficient differences, and are successively supplied to the other input terminals of the multipliers 28A and 28B. That is to say, in the correction coefficient generator 29A, the correction coefficients $X_1, X_2, X_3, \ldots X_{n-1}, X_n$ of the odd numbered light receiving elements are successively derived from the data $X_1$ and $(X_2-X_1)$ previously stored in the P-ROM 25 in the following manner:

$$X_1 = X_1$$

$$X_2 = X_1 + (X_2 - X_1)$$

$$X_3 = X_2 + (X_2 - X_1)$$

$$X_{n-1} = X_{n-2} + (X_2 - X_1)$$

$$X_n = X_{n-1} + (X_2 - X_1).$$

Moreover, in the correction coefficient generator 29B, the correction coefficients $Y_n, Y_{n-1}, Y_{n-2}, \ldots, Y_2, Y_1$ of the even numbered light receiving elements are successively derived from the data $Y_n$ and $(Y_{n-1}-Y_n)$ previously stored in the P-ROM 25 in the following manner:

$$Y_n = Y_n$$

$$Y_{n-1} = Y_n + (Y_{n-1} - Y_n)$$

$$Y_{n-2} = Y_{n-1} + (Y_{n-1} - Y_n)$$

$$Y_2 = Y_3 + (Y_{n-1} - Y_n)$$

$$Y_1 = Y_2 + (Y_{n-1} - Y_n)$$

In this manner, as is the same as the embodiments shown in FIGS. 11 and 12, since the incident light unbalance on the respective light receiving elements can be corrected, it is possible to obtain the required focus information by supplying the outputs of the multipliers 28A and 28B to the evaluation value calculation circuit 18 so as to derive the evaluation value and then by detecting the evaluation value in the detection circuit 19.

In this embodiment, since it is not necessary to store a large number of data in the P-ROM 25, it is possible to correct the incident light unbalance even if the incident light unbalance is varied due to the changing operation of the interchangeable lenses, the pupil position and an F-number variation, by selecting the data stored in the P-ROM 25 corresponding to the various conditions.

The present invention is not limited to the embodiments mentioned above, but various alternatives and modifications are possible. For example, in the embodiment mentioned above, the pupil dividing means 12 is constituted of the stripe mask, but it is possible to use a prism array as shown in FIG. 14A and to use a fly-eye lens array as shown in FIG. 14B. The prism lens array 12' shown in FIG. 14B is constructed by arranging alternately optical surfaces 30A and 30B at an almost critical angle in an inverting direction with each other with respect to the light axis of the imaging optical system 11. Therefore, if the light receiving element in the light receiving element array 13 corresponds to the respective optical surfaces, the odd numbered light receiving element group receives the light flux transmitted through one region of the exit pupil of the imaging optical system 11 and also the even numbered light receiving element group receives the light flux transmitted through the other region of the exit pupil. Moreover, in the fly-eye lens array 12" shown in FIG. 14B, respective fly-eye lenses 31 correspond to adjacent two light receiving elements on the light receiving element array 13, and these two light receiving elements receive respective the light fluxes transmitted through the different regions of the exit pupil of the imaging optical system 11. Further, in the embodiment mentioned above, the outputs of respective light receiving elements are multiplied by the correction coefficients so as to correct the incident light unbalance, but it is possible to effect the correction by dividing the outputs of respective light receiving elements by the correction coefficients. Further, use is made of a volatile memory such as a RAM instead of using a non-volatile memory such as the P-ROM so as to store the correction coefficients.

According to the invention, in the focus detection method which utilizes the image lateral shift, since the incident light unbalance on the light receiving element array which is caused by the image height effect and the relative positional shift between the pupil dividing means and the light receiving elements can be corrected by the correction coefficient previously stored in the digital memory, the variation of the light receiving element itself can be effectively corrected and thus it is possible to detect the focus condition always in the highly accurate manner. In addition, since it is not necessary to use the additional optical system, the whole optical system can be made small in size and inexpensive in cost.

What is claimed is:

1. An apparatus for detecting a focus condition of an imaging optical system comprising:
    a light receiving element array arranged on a predetermined focal plane of the imaging optical system;
    pupil dividing means for projecting light flux transmitted through first and second regions of an exit pupil of said imaging optical system to form first and second images on first and second light receiving element groups, respectively, of said light receiving element array;
    means for receiving protoelectric output signals supplied from the light receiving element array and for calculating a lateral shift amount between said two images;
    means for detecting a focus condition of an image formed by means of said imaging optical system in accordance with said lateral shift amount; and
    means for correcting an unbalance in an amount of light of said two images projected onto said first and second light receiving element groups, respectively, by multiplying the photoelectric output signals supplied from the light receiving element array by correction coefficients which are related to a standard image.

2. An apparatus according to claim 1, further comprising a digital memory for storing said correction coefficients.

3. An apparatus according to claim 1, further comprising a digital memory for storing only a part of said correction coefficients corresponding to a first number of the light receiving elements, and means for calculating the remaining correction coefficients corresponding to the remaining number of light receiving elements on the basis of the stored correction coefficients.

4. An apparatus according to claim 1, further comprising means for calculating said correction coefficients by deriving reciprocals of photoelectric output signals supplied from each light receiving element under a condition that a uniform light flux is projected onto said imaging optical system, and means for storing the correction coefficients thus calculated.

5. An apparatus according to claim 1, further comprising means for storing plural sets of correction coefficients each corresponding to respective interchangeable imaging lenses having different aperture numbers and focal lengths, said interchangeable imaging lenses being selectively used as said imaging optical system, and means for selecting one of said plural sets of correction coefficients in accordance with said interchangeable imaging lens used.

6. An apparatus according to claim 5, wherein said selecting means comprises a rotary switch which is manually operative and having indicators representing said different aperature numbers and focal lengths.

7. An apparatus according to claim 5, wherein said selecting means comprises means for automatically detecting the aperture number and focal length of the interchangeable imaging lens used.

* * * * *